United States Patent
Kawai et al.

(10) Patent No.: US 9,743,718 B2
(45) Date of Patent: Aug. 29, 2017

(54) BUCKLE AND SEAT BELT APPARATUS INCLUDING THE SAME

(71) Applicant: Takata Corporation, Tokyo (JP)

(72) Inventors: Yoshihiko Kawai, Tokyo (JP); Den Uehara, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 14/904,939

(22) PCT Filed: Jul. 3, 2014

(86) PCT No.: PCT/JP2014/067764
§ 371 (c)(1),
(2) Date: Jan. 13, 2016

(87) PCT Pub. No.: WO2015/015997
PCT Pub. Date: Feb. 5, 2015

(65) Prior Publication Data
US 2016/0135548 A1    May 19, 2016

(30) Foreign Application Priority Data

Aug. 2, 2013 (JP) .................................. 2013-161451

(51) Int. Cl.
*B60R 22/18* (2006.01)
*A44B 11/00* (2006.01)
*A44B 11/25* (2006.01)

(52) U.S. Cl.
CPC ...... *A44B 11/2546* (2013.01); *A44B 11/2515* (2013.01); *A44B 11/2561* (2013.01); *B60R 22/18* (2013.01); *B60R 2022/1806* (2013.01)

(58) Field of Classification Search
CPC . A44B 11/00; A44B 11/2503; A44B 11/2507; A44B 11/2515; A44B 11/2523;
(Continued)

(56) References Cited

U.S. PATENT DOCUMENTS

| 6,367,129 B1 * | 4/2002 | Mori | ................... A44B 11/2523 24/171 |
| 6,701,587 B1 * | 3/2004 | Sato | ................... A44B 11/2523 24/633 |

(Continued)

FOREIGN PATENT DOCUMENTS

| JP | 2001-025402 | 1/2001 |
| JP | 2001-046117 | 2/2001 |

(Continued)

OTHER PUBLICATIONS

International Search Report issued in related International Patent Application No. PCT/JP2014/067764, completed Sep. 5, 2014.

(Continued)

*Primary Examiner* — Faye M Fleming
(74) *Attorney, Agent, or Firm* — Foley & Lardner LLP

(57) ABSTRACT

[Object] To effectively reduce a noise generated during engaging operation of a tongue.
[Solution] A slider 13 held in a non-locking position, at which the slider 13 does not lock a latch 9, turns together with the latch 9 and moves so as to enter a space between the latch 9 and the locking pin 10 during operation of the latch 9. A front end 13a of the slider 13 comes in contact with a front end $25a_4$ of a damper 24 before coming in contact with a stop 11f of an operation button 11, and the slider 13 moves while compressing a damper spring 26. As a result, the movement of the slider 13 is slowed down. When the front end 13a is in contact with the stop 11f, the slider 13 is positioned in a locking position, at which the slider 13 locks the latch 9 positioned in the latching position. The slider 13 that has been slowed down comes in contact with the stop 11f, reducing the noise generated when the tongue engages with the buckle 7.

6 Claims, 9 Drawing Sheets

(58) Field of Classification Search
CPC ............... A44B 11/2584; B60R 22/18; B60R 2022/1806
See application file for complete search history.

(56) References Cited

U.S. PATENT DOCUMENTS

| | | | | |
|---|---|---|---|---|
| 8,215,716 | B2 * | 7/2012 | Akaike | A44B 11/2523 |
| | | | | 297/468 |
| 8,876,161 | B2 * | 11/2014 | Kawai | A44B 11/2507 |
| | | | | 180/268 |
| 9,015,913 | B2 * | 4/2015 | Muromachi | A44B 11/2523 |
| | | | | 24/633 |
| 2010/0314930 | A1 * | 12/2010 | Akaike | A44B 11/2523 |
| | | | | 297/468 |
| 2013/0249270 | A1 | 9/2013 | Kawai | |
| 2016/0302532 | A1 * | 10/2016 | Haas | A44B 11/2523 |

FOREIGN PATENT DOCUMENTS

| | | | | |
|---|---|---|---|---|
| JP | 2005-000290 | | 1/2005 | |
| JP | 2011000176 A | * | 1/2011 | ......... A44B 11/2523 |
| JP | 2012-126254 | | 7/2012 | |

OTHER PUBLICATIONS

The Extended European Search Report issued in Application No. 14831159.0 dated Jan. 5, 2017.

* cited by examiner

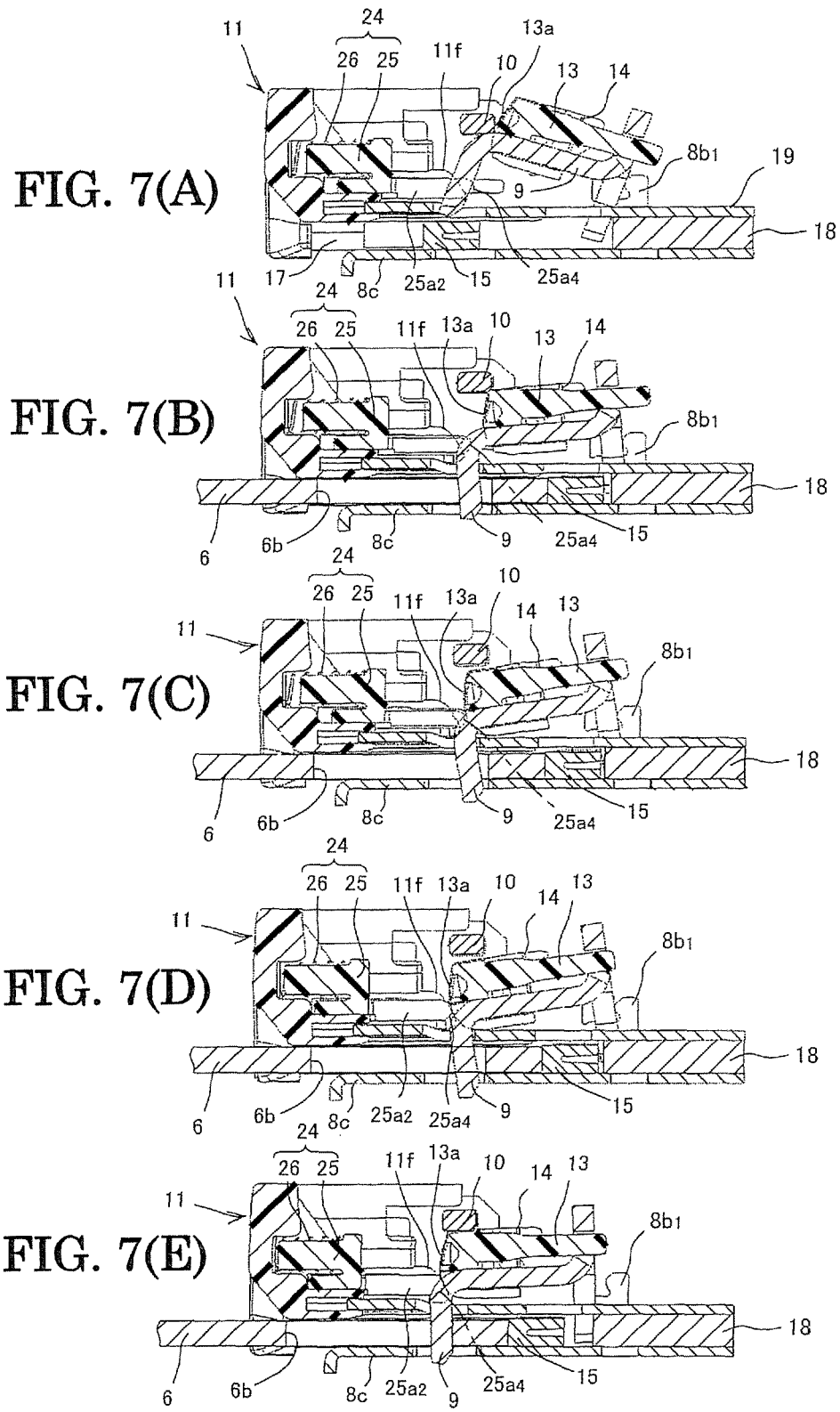

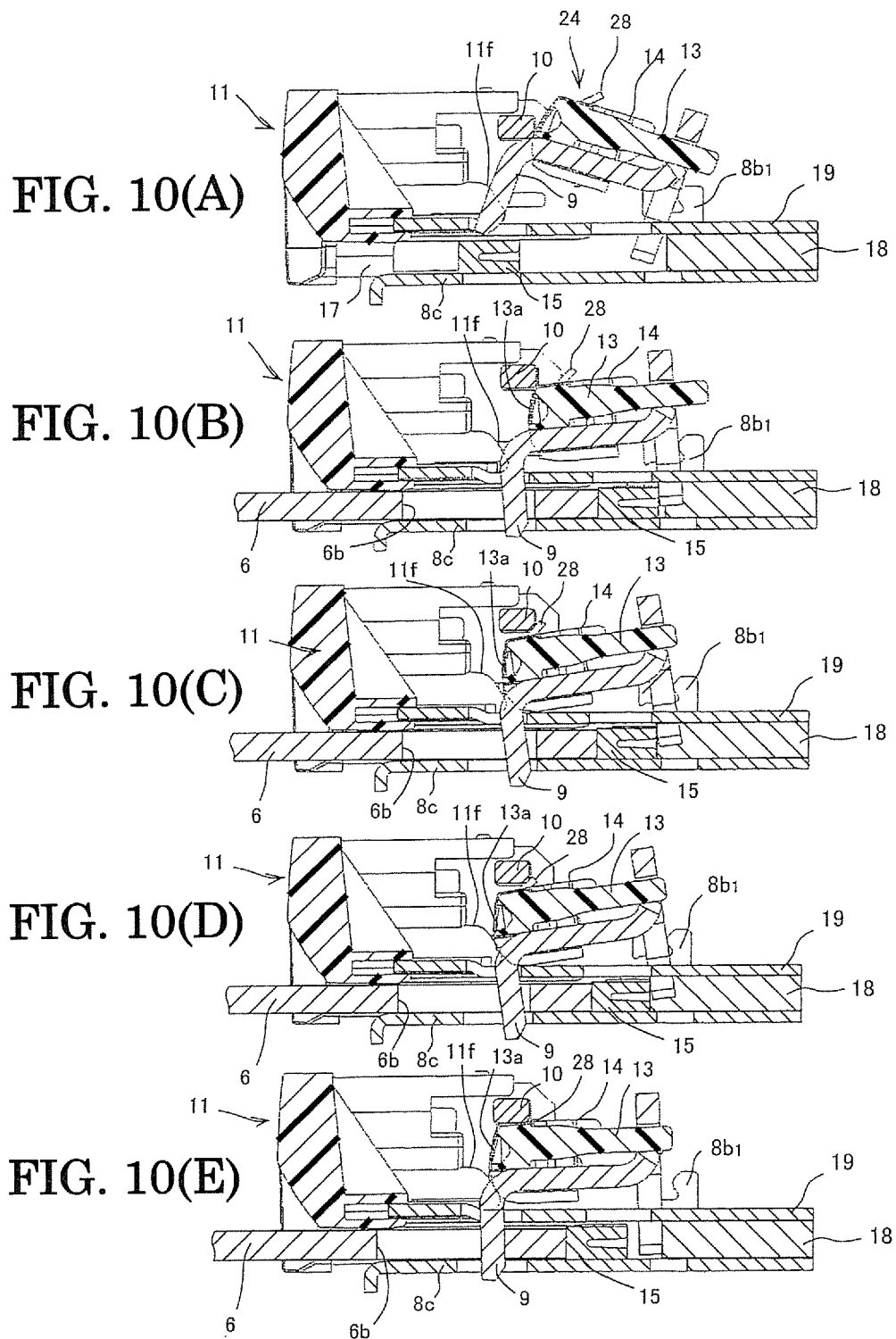

BUCKLE AND SEAT BELT APPARATUS INCLUDING THE SAME

TECHNICAL FIELD

The present invention belongs to a technical field of a buckle used in a seat belt apparatus attached to a seat of a vehicle such as an automobile, and a technical field of a seat belt apparatus including the buckle.

BACKGROUND ART

A seat belt apparatus is attached to a seat of various transport facilities including automobiles in order to hold an occupant and reduce inertial motion of the occupant when a vehicle is in an emergency situation such as a collision. In the emergency situation, the vehicle is largely slowed down compared with in a normal traveling situation. Such a seat belt apparatus typically includes a tongue supported by a seat belt and a buckle fixed to a chassis. The tongue is configured to be inserted into the buckle and engage therewith.

Widely-known buckles (for example, Patent Literature 1) used in conventional seat belt apparatus at least include a latch configured to enter an engaging hole of a tongue so as to engage with the tongue inserted into the buckle, a latch retainer configured to be moved by a biasing force of a spring so as to lock the latch in a locking position of the tongue during an engagement operation of the tongue with the latch, an unlocking operation member configured to unlock the latch locked by the latch retainer and remove the latch from the engaging hole of the tongue to disengage the latch from the tongue, and an ejector configured to push the tongue disengaged from the latch by the unlocking operation member in a direction in which the tongue is removed from the buckle.

In a seat belt apparatus including such a buckle, when the occupant wears the seat belt, the tongue is inserted into the buckle, and the latch engages with the tongue. Thus, the tongue engages with the buckle. As a result, the seat belt is fastened to the occupant such that the occupant is held by the seat belt in the event of an emergency as described above. This reduces the inertial movement of the occupant. The occupant pushes the unlocking operation member to release the seat belt from the occupant. As a result, the latch is disengaged from the tongue.

CITATION LIST

Patent Literature

PTL 1: Japanese Unexamined Patent Application Publication No. 2001-025402

SUMMARY OF INVENTION

Technical Problem

In conventional buckles, the latch retainer is typically moved by a biasing force of a spring during the engagement operation of the tongue with the latch. When the latch is positioned in an engagement position at which the latch engages with the tongue after the movement of the latch retainer, the latch retainer comes in contact with a different component of the tongue, which is unmovable at least in a movement direction of the latch retainer in the operation, and stops. The contact between the latch retainer and the different component of the buckle generates a noise.

In the buckle in which a metal frame is used as the different component, which is unmovable in the movement direction of the latch retainer in operation, and a metal retainer is used as the latch retainer, the retainer comes in contact with the stop of the frame when the retainer is moved, and thus the above-described noise may be generated by contact between the metal components of the buckle. To solve this problem, Patent Literature 1 discloses a buckle in which the metal retainer stops when the retainer comes in contact with a stop disposed on a resin release button, which is the unlocking operation member. The contact between the metal component and the resin component generates less noise when the buckle engages with the tongue than the contact between the metal components.

Although the buckle described in Patent Literature 1 has less noise due to the contact between the metal component and the resin component, as long as the retainer comes in contact with the release button, the noise is generated by impact of the contact. Thus, it is difficult to effectively reduce the noise to be generated when the buckle engages with the tongue. The generation of the noise needs to be more effectively reduced to further improve comfortability of the occupant during seat belt handling.

The present invention was made in view of the above-described problem. It is an object of the present invention to provide a buckle in which a noise is less generated during an engagement operation of the tongue with the buckle, and a seat belt apparatus including such a buckle.

Solution to Problem

To solve the problem described above, a buckle of the present invention is characterized by at least including a base, a tongue inlet through which an engaging portion of a tongue is inserted, a latch supported by the base so as to move between a non-engaging position at which the latch does not engage with the engaging portion of the tongue inserted through the tongue inlet and an engaging position at which the latch engages with the engaging portion of the tongue inserted through the tongue inlet, a latch retainer configured to be held in a non-locking position at which the latch retainer does not lock the latch positioned in the non-engaging position and configured to move from the non-locking position during operation of the latch and come in contact with a stop so as to be held in a locking position at which the latch retainer locks the latch positioned in the engaging position, and an unlocking operation member configured to move the latch positioned in the engaging position to the non-engaging position, wherein an impact absorbing mechanism configured to, during the operation of the latch, slow down the movement of the latch retainer before the latch retainer in motion comes in contact with the stop, such that the movement of the latch retainer that is slowed down comes in contact with the stop.

In addition, the buckle according to the present invention is characterized in that the impact absorbing mechanism includes an impact receiver with which the latch retainer comes in contact before coming in contact with the stop, and a damper spring configured to bias the impact receiver, and that the latch retainer comes in contact with the impact receiver so as to elastically deform the damper spring, such that the movement of the latch retainer is slowed down.

In addition, the buckle according to the present invention is characterized in that the impact receiver and the damper spring are integrally provided in the unlocking operation member.

In addition, the buckle according to the present invention is characterized in that the impact absorbing mechanism includes an impact receiver that is elastically deformable, and that the impact receiver is elastically deformed before the latch retainer in motion comes in contact with the stop, such that the movement of the latch retainer is slowed down.

In addition, the buckle according to the present invention is characterized in that the impact receiver has a fin-like shape and is integrally formed with the latch retainer.

A seat belt apparatus according to the present invention is characterized by at least including a seat belt configured to hold an occupant, a seat belt retractor disposed on a chassis and configured to retract the seat belt, and a buckle disposed on the chassis and configured to engage with a tongue in a removable manner, wherein the buckle is any one of the above-described buckles.

Advantageous Effects of Invention

According to the buckle of the present invention having the above-described configuration, during an operation to engage the latch with the tongue, the impact absorbing mechanism slows down the movement of the latch retainer before the latch retainer comes in contact with the stop. Then, the latch retainer comes in contact with the stop and is positioned in the locking position at which the latch retainer locks the latch at the engaging position. Thus, the impact of the contact between the latch retainer and the stop is reduced. This effectively reduces the noise generated when the latch retainer comes in contact with the stop. Particularly, since the latch retainer is slowed down immediately before the latch retainer comes in contact with the stop, the latch retainer is not slowed down too much. Thus, although the buckle includes the impact absorbing mechanism, the engagement of the tongue with the buckle is relatively promptly performed, and the noise is effectively reduced.

In addition, the impact absorbing mechanism includes the impact receiver and the damper spring. The latch retainer comes in contact with the impact receiver before the latch retainer comes in contact with the stop and elastically deforms the damper spring. As a result, the movement of the latch retainer is slowed down. Thus, the impact absorbing mechanism having a simple configuration reduces the above-described impact. Particularly, since the impact receiver and the damper spring are integrally provided in the unlocking operation member, the impact absorbing mechanism is able to be constituted as a sub assembly of the unlocking operation member. Thus, the number of components is reduced, and the impact absorbing mechanism is able to be mounted easily.

In addition, the impact absorbing mechanism includes the impact receiver that is elastically deformable, and the impact receiver is elastically deformed before the latch retainer in motion comes in contact with the stop, whereby the movement of the latch retainer is slowed down. Thus, the impact absorbing mechanism having such a simple configuration is able to reduce the above-described impact. Particularly, the impact receiver and the latch retainer are integrally formed of a single component, the number of components is reduced, and the configuration of the impact absorbing mechanism is simplified.

In the seat belt apparatus of the present invention, the noise generated during the engagement operation of the tongue with the buckle is reduced. Thus, comfortability of the occupant during the engagement operation of the tongue with the buckle is improved.

BRIEF DESCRIPTION OF DRAWINGS

FIG. 7(A) to FIG. 7(E) are views indicating operations of the buckle of the example.

FIG. 10(A) to FIG. 10(E) are views indicating operations of the buckle of the other example.

DESCRIPTION OF EMBODIMENTS

Hereinafter, an embodiment of the present invention is described with reference to the drawings.

Figure 1:
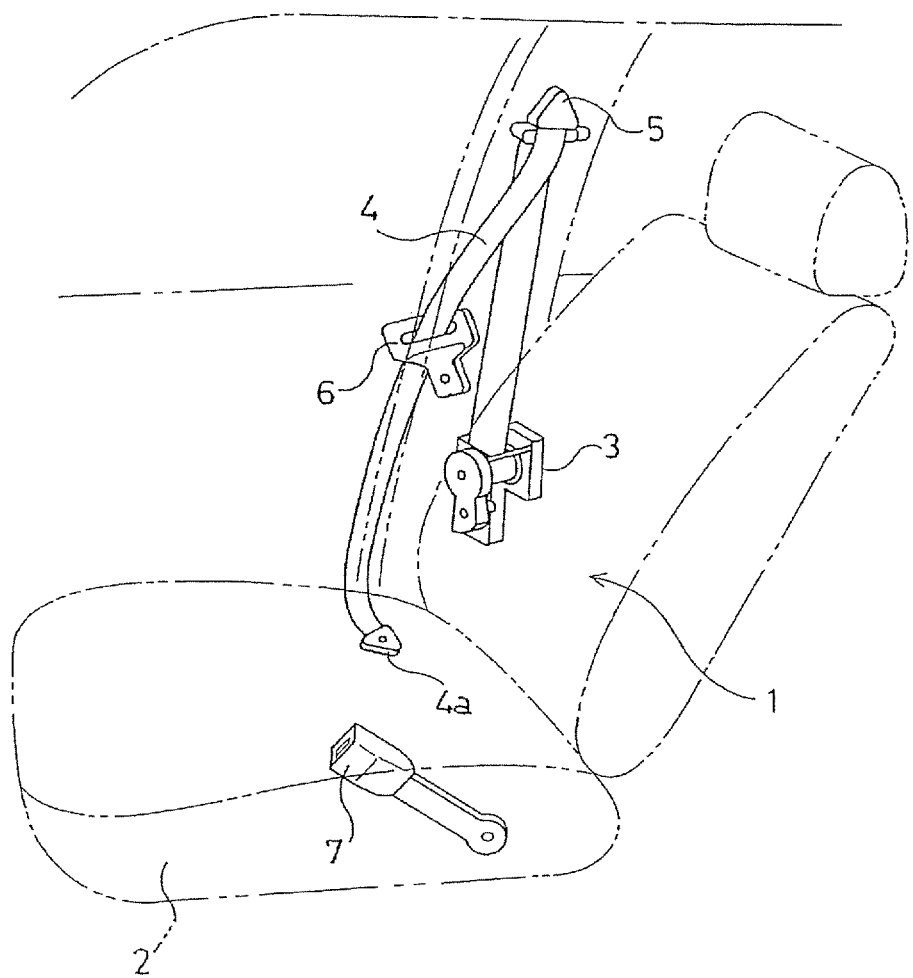
FIG. 1 is a view schematically illustrating a seat belt apparatus including a buckle of an example according to an embodiment of the present invention.

As illustrated in FIG. 1, a seat belt apparatus 1 of this example has basically the same configuration as widely known three-point seat belt apparatuses. In the drawings, a reference numeral 1 denotes the seat belt apparatus, 2 denotes a vehicle seat, 3 denotes a seat belt retractor disposed adjacent to the vehicle seat 2, 4 denotes a seat belt configured to be retracted by the seat belt retractor 3 in a withdrawable manner and having a belt anchor 4a fixed to a floor of a chassis or the vehicle sheet 2 at its end, 5 denotes a guide anchor 5 configured to guide the seat belt 4 withdrawn from the seat belt retractor 3 toward the shoulder of the occupant, 6 denotes a tongue slidably supported by the seat belt 4 guided by the guide anchor 5, and 7 denotes a buckle fixed on the floor of the chassis or the vehicle seat and to which the tongue 6 is inserted such that the buckle 7 engages with the tongue 6 in a removable manner.

The configuration and the operation of the buckle 7 of this example are substantially identical to those of the buckle described in Japanese Unexamined Patent Application Publication No. 2012-126254 in many parts. However, the configuration and the operation of the buckle 7 of this example, which include the configuration and the operation identical to those of the buckle described in Japanese Unexamined Patent Application Publication No. 2012-126254, are described.

As illustrated in FIGS. 2(A) and 2(B), FIGS. 3(A) and 3(B), and FIGS. 4(A) and 4(B), as in the buckle described in Japanese Unexamined Patent Application Publication No. 2012-126254, the buckle 7 of this example includes a base 8 formed of a U-shaped frame having first and second side walls 8a and 8b and a bottom 8c, a latch 9 rotatably supported by the first and second side walls 8a and 8b of the base 8 and movable between a non-latching position (non-engaging position) at which the latch 9 does not engage with a planar engaging portion 6a of the tongue 6 and a latching position (engaging position) at which the latch 9 engages with the tongue 6, a locking pin 10 fixed to the first and second side walls 8a and 8b of the base 8 in an unmovable manner and configured to prevent the latch 9 from moving in an unlatching direction when the tongue 6 engages with the latch 9, a resin operation button 11, which is an unlocking operation member, movable in a longitudinal direction of the first and second side walls 8a and 8b of the base 8, a button spring 12 configured to constantly bias the operation button 11, a resin (or metal) slider 13 (corresponding to the latch retainer of the present invention) slidably supported by the latch 9 and configured to enter a space between the latch 9 and the locking pin 10 when the tongue 6 engages with the latch 9, a slider spring 14, which is a biasing member for the latch retainer, disposed between the slider 13 and the latch 9 so as to be compressed thereby and configured to constantly bias the slider 13 toward the locking pin 10, an ejector 15 disposed on the bottom 8c of the base 8 so as to slide in the longitudinal direction of the base 8 and configured to bias (push) the tongue 6 in a direction in which the tongue 6 is removed from the buckle 7, and an ejector spring 16 configured to constantly bias (push) the ejector 15 in the direction in which the tongue 6 is removed from the buckle 7 (i.e., in a direction toward a tongue inlet 17 which is described later). The buckle 7 of this example includes a damper (impact absorbing mechanism) 24, which is not included in the buckle described in Japanese Unexamined Patent Application Publication No. 2012-126254.

The buckle 7 of this example has the tongue inlet 17 at a position between an end of the bottom 8c of the base 8 and the operation button 11. In addition, the above-described components (indicated by the reference numerals 9 to 16) of the buckle 7 are mounted on the base 8. Then, the bottom 8c of the base 8 is fixed to a bracket 18 fixed to the chassis so that the buckle 7 is fixed to the chassis through the bracket 18. In this case, the bracket 18 is sandwiched between an end $8c_1$ of the bottom 8c of the base 8 opposite the end adjacent to the tongue inlet 17 and a plate 19 and fastened by a pair of rivets 20, whereby the buckle 7 is attached to the bracket 18. Although not illustrated, as in the buckle described in Japanese Unexamined Patent Application Publication No. 2012-126254, the base 8 to which the above-described components (9 to 16) of the buckle 7 are mounted is covered by an upper cover and a lower cover from above and below.

In addition, in the buckle 7 of this example, the ejector spring 16 includes a first ejector spring 16a and a second ejector spring 16b. The first and second ejector springs 16a and 16b each have a smaller elastic constant, a smaller coil diameter, and a smaller wire diameter than conventional ejector springs. However, the first and second ejector springs 16a and 16b are identical to each other in the elastic constant and size (a coil diameter, a wire diameter, and a length in the longitudinal direction).

In addition, the entire first ejector spring 16a is disposed at an outer side of the first side wall 8a of the base 8 (side opposite to the second side wall 8b) so as to be positioned outside an area α, which is a movement path of the engaging portion 6a of the tongue 6 in the buckle 7, and outside an imaginary extended area β, which extends from the area α in the movement direction of the engaging portion 6a. In addition, the entire of the second ejector spring 16b is disposed at an outer side of the second side wall 8b of the base 8 (side opposite to the first side wall 8a) so as to be positioned outside the area α and the imaginary extended area β.

In this case, the first and second ejector springs 16a and 16b are each supported by an ejector spring guide support 21 fixed to each of ends $8a_1$ and $8b_1$, which are fixed to the bracket 18, of the respective first and second side walls 8a and 8b. In such a case, the ejector spring guide support 21 includes a first ejector spring guide 21a extending along or substantially parallel to the first side wall 8a toward the tongue inlet 17 and a second ejector spring guide 21b extending along or substantially parallel to the second side wall 8b toward the tongue inlet 17. Then, the first ejector spring 16a fitted to the first ejector spring guide 21a is supported and guided by the first ejector spring guide 21a, and the second ejector spring 16b fitted to the second ejector spring guide 21b is supported and guided by the second ejector spring guide 21b.

Figure 4A:
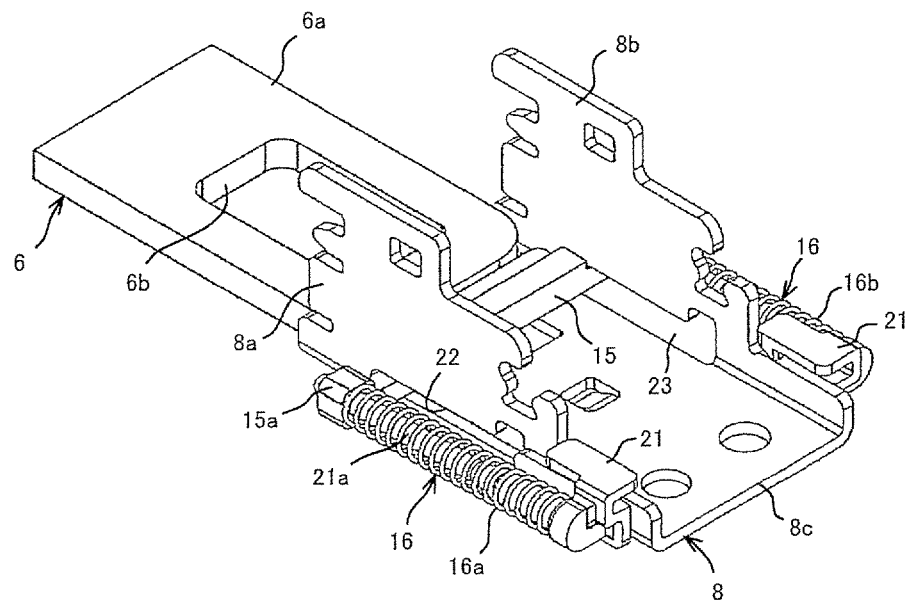
FIG. 4(A) is a perspective view indicating a positional relationship of a tongue, an ejector, an ejector spring, and a base viewed obliquely from above.
Figure 4B:
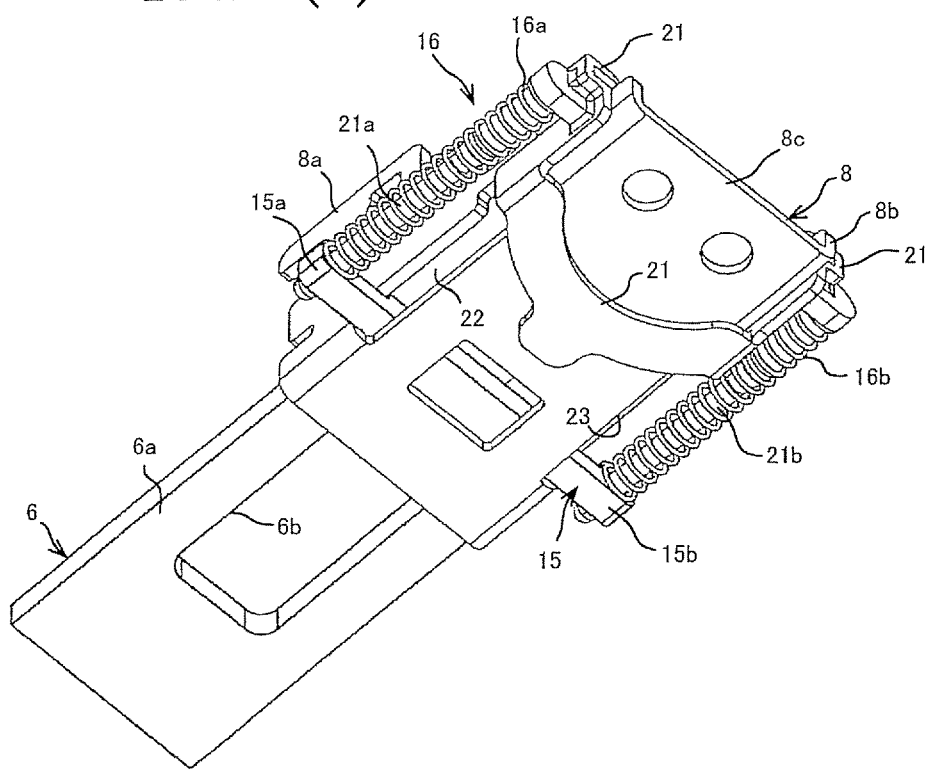
FIG. 4(B) is a perspective view indicating the relationship of the same viewed obliquely from below.

As illustrated in FIGS. 4(A) and 4(B), the first and second side walls 8a and 8b, respectively, have first and second through holes 22 and 23 extending in a movement direction of the ejector 15. A first end portion 15a in a direction perpendicular or substantially perpendicular to the movement direction of the ejector 15 is disposed through the first through hole 22 in a slidable manner, and a second end portion 15b of the ejector 15 in the above-described direction disposed through the second through hole 23 in a slidable manner.

In addition, the first end portion 15a of the ejector 15 is slidably fitted to the first ejector spring guide 21a, and the second end portion 15b of the ejector 15 is slidably fitted to the second ejector spring guide 21b. The first end portion 15a of the ejector 15 is constantly biased toward the tongue inlet 17 by a biasing force of the first ejector spring 16a, and the second end portion 15b of the ejector 15 is constantly biased toward the tongue inlet 17 by a biasing force of the second ejector spring 16b.

Figure 5A:
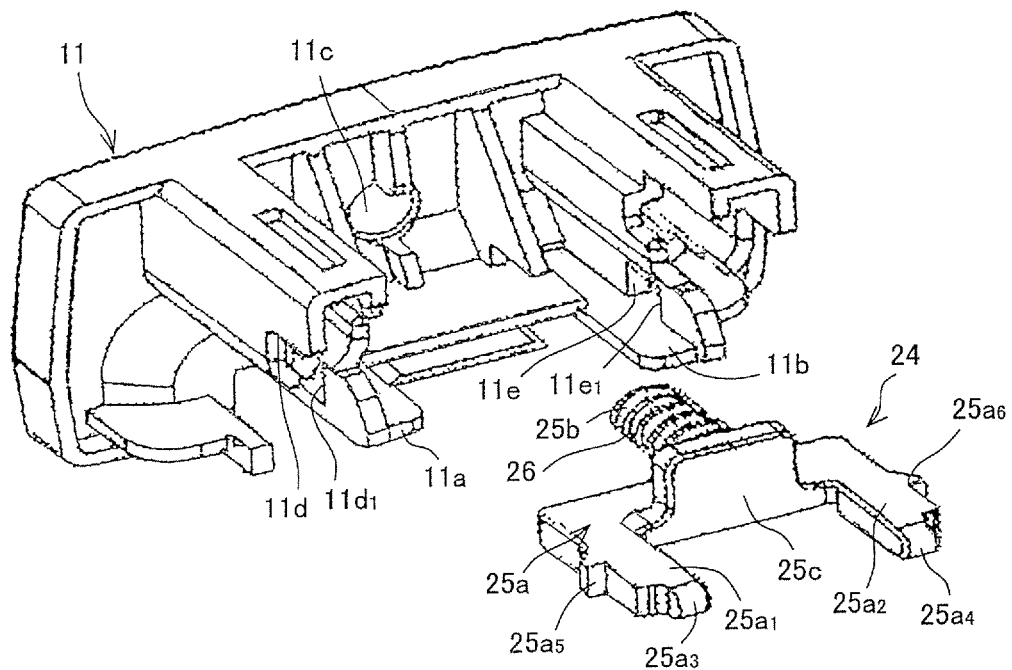
FIG. 5(A) is an exploded perspective view illustrating an operation button and an impact absorbing mechanism of the example.
Figure 5B:
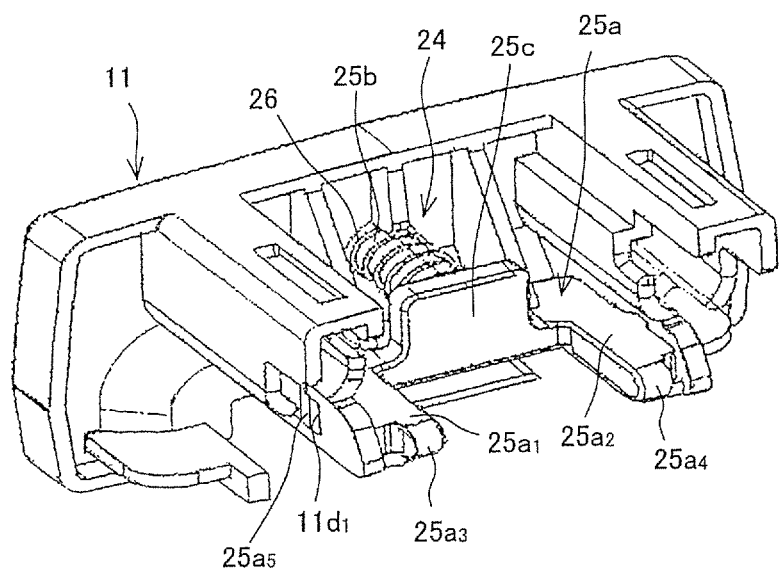
FIG. 5(B) is a perspective view illustrating a sub assembly in which the impact absorbing mechanism is integrally mounted in the operation button.
Figure 6C:
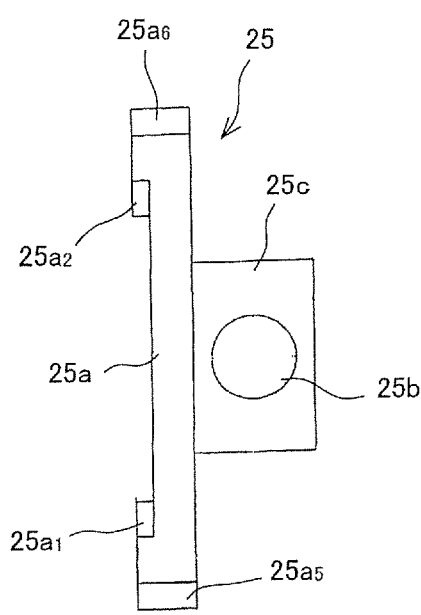
FIG. 6(C) is a left side view of the impact receiver in FIG. 6(B).
Figure 6B:
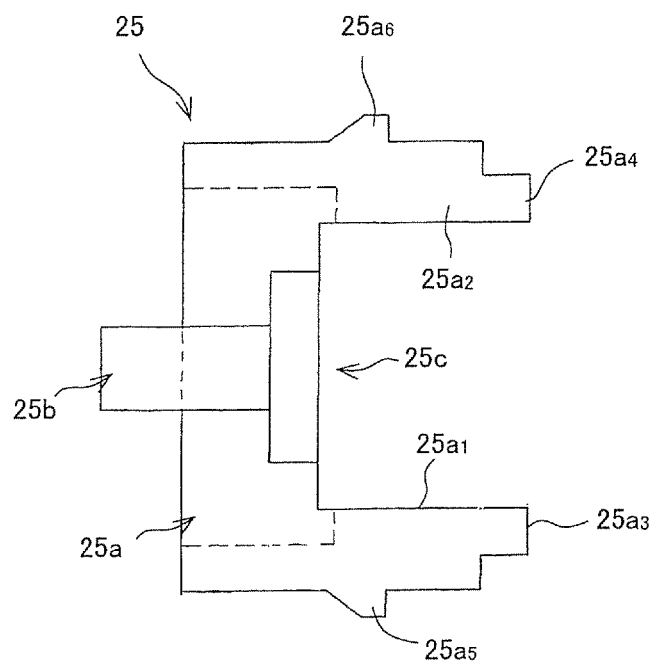
FIG. 6(B) is a top view (plan view) of the impact receiver.
Figure 6A:
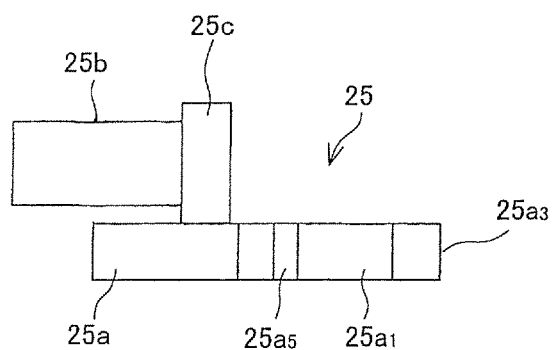
FIG. 6(A) is a front view illustrating an impact receiver of the impact absorbing mechanism.

As illustrated in FIGS. 2(A) and 2(B), FIGS. 3(A) and 3(B), and FIGS. 5(A) and 5(B), the damper 24 includes an impact receiver 25 and a damper spring 26 configured to bias the impact receiver 25. As illustrated in FIGS. 6(A) to 6(C), the impact receiver 25 includes a body 25a and a spring support 25b supporting the damper spring 26.

The body 25a includes a pair of impact receiving arms $25a_1$ and $25a_2$ and has a planar U-like shape (or C-like shape) in plan view. A front end 13a of the slider 13 (illustrated in FIG. 2(B) and FIG. 3(B)) is able to come in contact with front ends $25a_3$ and $25a_4$ of the respective impact receiving arms $25a_1$ and $25a_2$ during the operation of the slider 13. The impact receiving arms $25a_1$ and $25a_2$ include stopper $25a_5$ and $25a_6$, respectively.

The spring support 25b is a cylindrical bar. The spring support 25b is positioned at a middle between the arms $25a_1$ and $25a_2$ slightly above the body 25a as illustrated in FIG. 6(A) and extends integrally from the body 25a through the support member 25c in the movement direction of the impact receiver 25. The body 25a, the spring support 25b, and the support member 25c (i.e., the impact receiver 25) are integrally formed of a single resin member.

As illustrated in FIGS. 2(A) and 2(B), FIGS. 3(A) and 3(B), and FIGS. 5(A) and 5(B), the operation button 11 includes a pair of guides 11a and 11b and a recess 11c. The guides 11a and 11b each have an L-like shape in a transverse section and extend in a movement direction of the operation button 11. Vertical walls of the guides 11a and 11b, respectively, have rectangular through holes 11d and 11e each having a partially open upper side. The recess 11c has a cylindrical shape having a diameter large enough to receive the spring support 25b and the damper spring 26.

The body 25a of the impact receiver 25 is slidably supported by the pair of guides 11a and 11b in the movement direction of the operation button 11 with the damper spring 26 being fitted to the spring support 25b. In such a case, when a first end portion of the spring support 25b enters the recess 11c, a first end of the damper spring 26 enters the recess 11c and comes in contact with the bottom of the recess 11c. In addition, the stoppers $25a_5$ and $25a_6$ are each slidably fitted to the corresponding through holes 11d and 11e. In this way, the damper 24 is integrally mounted to the operation button 11, and thus an operation button sub assembly is obtained. As a result, the damper 24 is able to be mounted easily. In the operation button sub assembly in which the damper 24 is mounted, the damper spring 26 is compressed between the operation button 11 and the impact receiver 25. Thus, the impact receiver 25 is constantly biased toward the latch 9 by the damper spring 26, and the impact receiver 25 is held in a non-operating position at which the stoppers $25a_5$ and $25a_6$ are each in contact with an edge of the corresponding through holes 11d and 11e, as illustrated in FIG. 5(B) (FIG. 5(B) shows only a state in which the stopper $25a_5$ is in contact with the edge $11d_1$ of the through hole 11d, but the same is applicable to the other stopper $25a_6$). In other words, the damper 24 is in a non-operating state.

When the damper 24 is in the non-operating state, the front ends $25a_3$ and $25a_4$ of the respective impact receiving arms $25a_1$ and $25a_2$ of the body 25a are positioned closer to the latch 9 than the front ends of the guides 11a and 11b of the operation button 11 in the non-operating position. In this case, the front ends of the guides 11a and 11b are positioned further from the latch 9 than the stop 11f (corresponding to the stop of the present invention) of the operation button 11. The stop 11f of the operation button 11 in the non-operating state causes the slider 13 that has come into contact therewith finally to stop.

With this configuration, when the slider 13 is moved by the biasing force of the slider spring 14, the front end 13a of the slider 13 comes in contact with the front ends $25a_3$ and $25a_4$ of the respective impact receiving arms $25a_1$ and $25a_2$ and do not come in contact with the guides 11a and 11b. In addition, the biasing force of the damper spring 26 is smaller than the biasing force of the slider spring 14. Thus, after the slider 13 is moved by the biasing force of the slider spring 14 such that the front end 13a thereof comes in contact with the front ends $25a_3$ and $25a_4$ of the respective impact receiving arms $25a_1$ and $25a_2$, the slider 13 is able to move further together with the body 25a while compressing the damper spring 26. Then, the slider 13 stops when the front end 13a thereof comes in contact with the stop 11f of the operation button 11. Thus, the slider 13 is not in contact with the guides 11a and 11b. Instead of the stop 11f of the operation button 11, the slider 13 may be configured to come in contact with the guides 11a and 11b so as to finally stop. In such a case, the body 25 needs to be in contact with a portion of the operation button 11 to stop the movement thereof.

The operation button 11 is normally (during non-operating state) held in the non-operating position illustrated in FIGS. 2(A) and 2(B) and FIGS. 3(A) and 3(B) by the biasing force of the button spring 12. Thus, as in the conventionally known buckles, the operation button 11 is held in the non-operating position by a stopper (not illustrated) disposed on a cover of the buckle or the base 8 so as not to be moved further in a biasing direction of the button spring 12 (to the left in FIG. 2(B) and FIG. 3(B), i.e., a direction opposite to the unlatching direction).

Next, operations of the buckle 7 of this example having the above-described configuration are described.

Figure 2A:
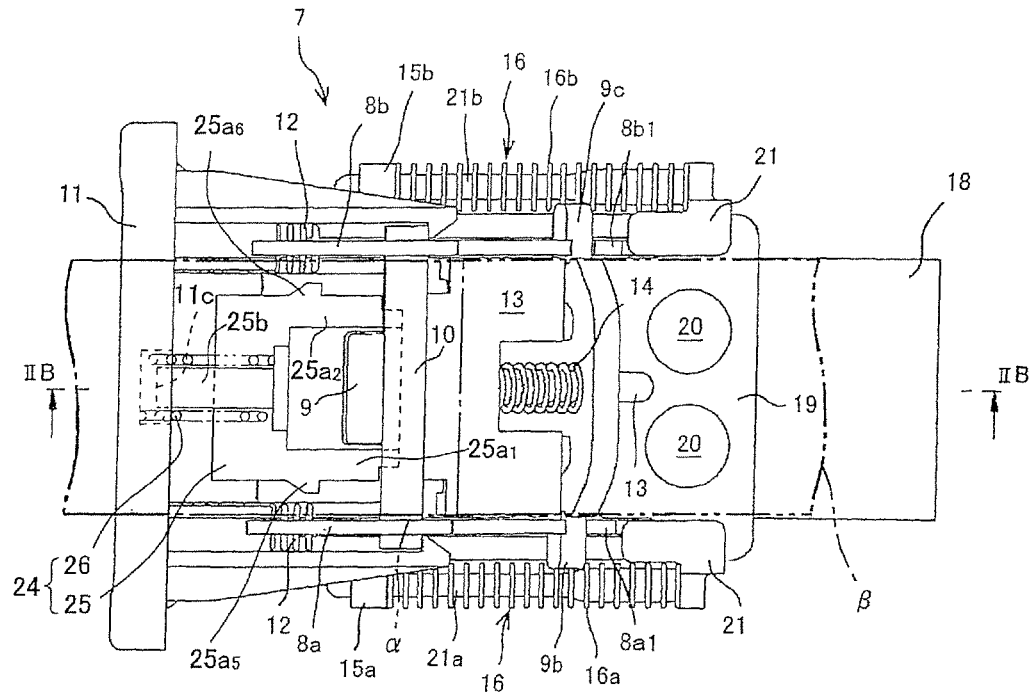
FIG. 2(A) is a top view (plan view) partially illustrating the buckle of the seat belt apparatus of the example in a state in which the tongue is not inserted.
Figure 2B:
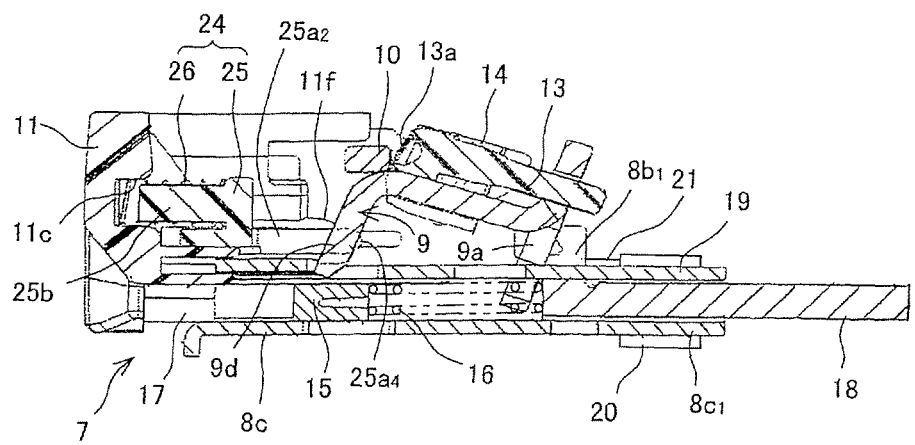
FIG. 2(B) is a cross-sectional view taken along a line IIB-IIB in FIG. 1(A).

When the tongue 6 is removed from the buckle 7, the buckle 7 is in the non-operating state as illustrated in FIGS. 2(A) and 2(B) and FIG. 7(A). In the non-operating state of the buckle 7, the latch 9 is in the non-latching (non-engaging) position (non-operating position), and the operation button 11 and the slider 13 are in the non-operating positions. In addition, the damper 24 is in the non-operating state as illustrated in FIGS. 2(A) and 2(B) and FIG. 7(A). Thus, the front end of the slider 13 is in contact with the locking pin 10 and is not in contact with the impact receiver 25 of the damper 24. In addition, the slider 13 is in the non-locking position (non-operating position) at which the slider 13 does not lock the latch 9.

In addition, the ejector 15 is positioned in the non-operating position at which the ejector 15 is positioned closest to the tongue inlet 17. In the ejector 15 positioned in the non-operating position, the first and second end portions 15a and 15b of the ejector 15 stop at predetermined positions while being fitted with the first and second ejector spring guides 21a and 21b. In this state, the first and second ejector springs 16a and 16b bias the respective first and second end portions 15a and 15b of the ejector 15 with relatively small force toward the tongue inlet 17. In addition, the sloping front end 13a of the slider 13 is in contact with the locking pin 10 by the biasing force of the slider spring 14, and the slider 13 is held in the non-operating position.

When the buckle 7 is in such a non-operating state, the engaging portion 6a of the tongue 6 is inserted to the buckle 7 through the tongue inlet 17 such that the seat belt 4 is fastened. When the engaging portion 6a is inserted into the buckle 7 by a predetermined length, the front end of the engaging portion 6a is in contact with an end of the ejector 15. When the tongue 6 is inserted further into the buckle 7, the ejector 15 is pushed by the engaging portion 6a and moved to the right in FIGS. 2(A) and 2(B) and FIG. 7(A) while compressing the first and second ejector springs 16a and 16b. When the tongue 6 is inserted further into the buckle 7, the front end of the engaging portion 6a comes in contact and pushes a first pressed portion 9a of the latch 9. Then, the latch 9 turns in a counterclockwise direction in FIG. 2(B) and FIG. 7(A) about pivot portions 9b and 9c, which are positioned at side edges of the latch 9 and rotatably supported by the side walls 8a and 8b. As a result, a latching portion 9d of the latch 9 moves toward the movement path of the engaging portion 6a of the tongue 6. At this time, the slider 13 turns together with the latch 9 in the same direction.

As illustrated in FIG. 7(B), when an engaging hole 6b of the engaging portion 6a of the tongue 6 reaches the position where the latching portion 9d of the latch 9 is able to enter the engaging hole 6b, the latching portion 9d enters the engaging hole 6b of the engaging portion 6a. As illustrated in FIG. 7(C), the slider 13 moves away from the locking pin 10 due to the turn of the slider 13 and moves to a position under the locking pin 10. Then, immediately before the front end 13a of the slider 13 comes in contact with the stop 11f of the operation button 11, the slider 13 comes in contact with the front ends $25a_3$ and $25a_4$ of the respective impact receiving arms $25a_1$ and $25a_2$. In addition, the slider 13 moves further together with the impact receiver 25 while compressing the damper spring 26 of the damper 24. In such a case, resistance is applied to the slider 13 by the compression of the damper spring 26, and thus the movement of the slider 13 is slowed down.

As illustrated in FIG. 7(D), when the front end 13a of the slider 13 comes in contact with the stop 11f of the operation button 11, the slider 13 stops and is in the locking position. At this time, the impact of the contact between the slider 13 and the stop 11f is reduced since the movement of the slider 13 is slowed down by the damper 24 before the slider 13 comes in contact with the stop 11f. This reduces the noise generated when the slider 13 comes in contact with the stop 11f. Then, the slider 13 is positioned between the latch 9 at the latching position and the locking pin 10 and held down by the locking pin 10, and thus the latch 9 is held in the latching position by the slider 13.

Figure 3A:
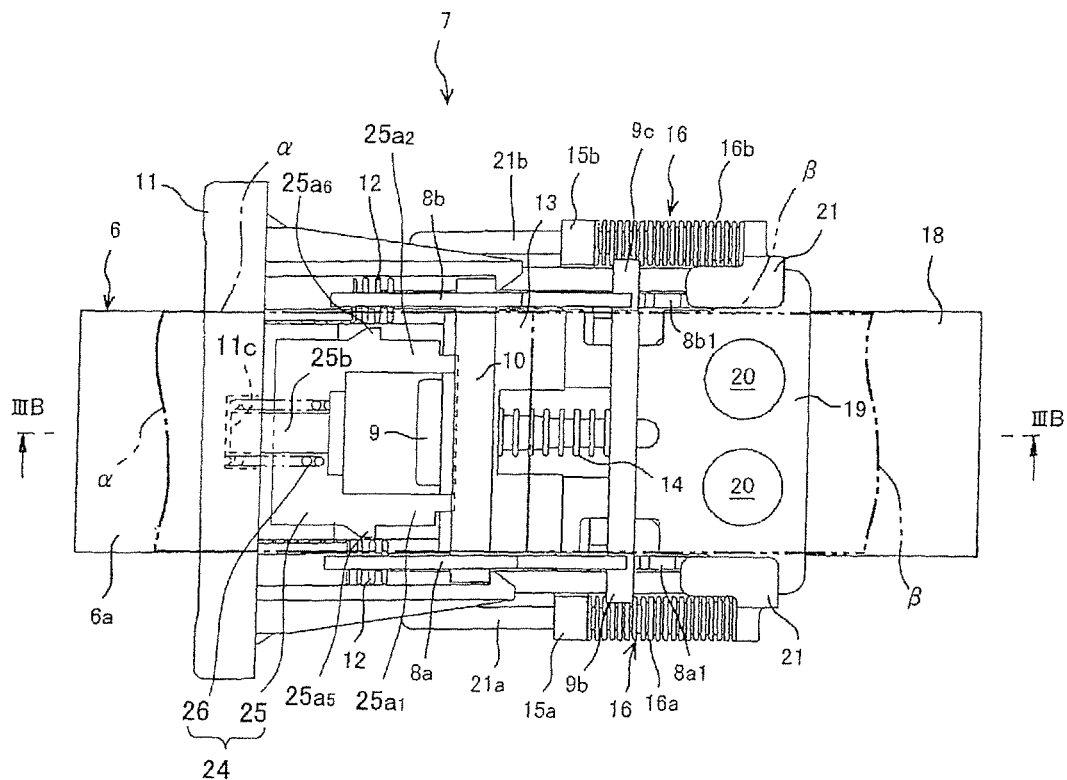
FIG. 3(A) is a top view (plan view) partially illustrating the buckle of the example in a state in which the tongue is inserted.
Figure 3B:
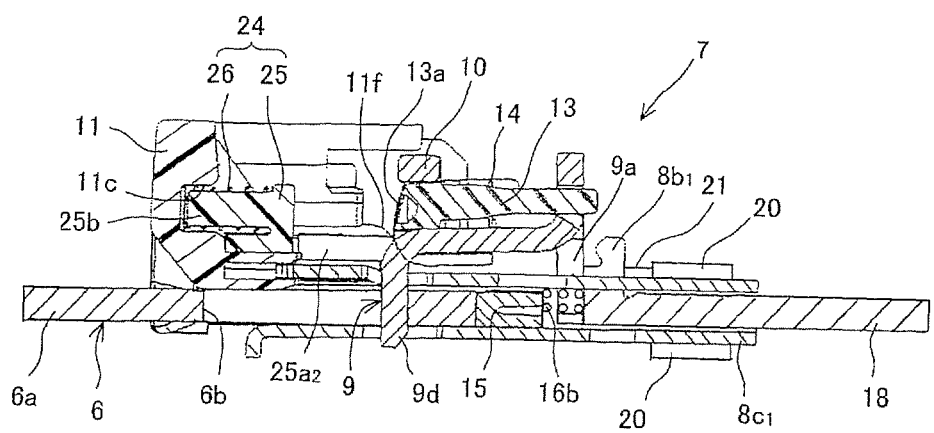
FIG. 3(B) is a cross-sectional view taken along a line IIIB-IIIB in FIG. 3(A).

When the occupant releases the tongue 6 in this state, the engaging portion 6a is pushed and moved by the ejector 15 in a removal direction in which the tongue 6 is removed from the buckle 7. As a result, as illustrated in FIGS. 3(A) and 3(B) and FIG. 7(E), the edge of the engaging hole 6b of the engaging portion 6a comes in contact with the latching portion 9d of the latch 9, and the lacking portion 6a is prevented from moving in the removal direction in which the tongue 6 is removed from the buckle 7. In this way, the tongue 6 engages with the buckle 7. Then, an extra withdrawn portion of the seat belt 4 is retracted by the seat belt retractor 3, and thus the seat belt 4 is fastened to the occupant.

When the operation button 11 of the buckle 7 in an operational state illustrated in FIG. 3(A) and FIG. 3(B) and FIG. 7 (E) is pushed and moved to the right in FIGS. 3(A) and 3(B) to release the seat belt 4, the operation button 11 comes in contact with the slider 13 and pushes the slider 13. Then, the slider 13 moves to the right in FIGS. 3(A) and 3(B) while compressing the slider spring 14. When the slider 13 moves away from the position under the locking pin 10, the latch 9 turns in the counterclockwise direction in FIG. 3(B) about the pivot portions 9b and 9c together with the slider 13. As a result, the latching portion 9d of the latch 9 moves in a direction away from the movement path of the engaging portion 6a of the tongue 6.

When the latching portion 9d of the latch 9 is removed from the engaging hole 6b, the latch 9 is unlatched from the tongue 6. Then, the ejector 15 is moved together with the tongue 6 toward the tongue inlet 17 (to the left in FIGS. 3(A) and 3(B)) by the biasing force of the first and second ejector springs 16a and 16b. Thus, the tongue 6 is removed from the buckle 7. Then, the seat belt 4 withdrawn so as to be worn is retracted by the seat belt retractor 3.

As illustrated in FIG. 2(B), when the latch 9 comes in contact with the locking pin 10, the latch 9 stops turning and is positioned in the non-operating position (non-latching position) as illustrated in FIG. 2(B). In addition, the impact receiver 25 moves toward the non-operating position thereof by the biasing force of the damper spring 26 due to the movement of the slider 13. Then, when the stoppers $25a_5$ and $25a_6$ of the impact receiver 25 comes in contact with the edges $11d_1$ and $11e_1$ of the through holes 11d and 11e of the operation button 11, the impact receiver 25 stops and is positioned in the non-operating position. In addition, due to the movement of the slider 13, the front end 13a of the slider 13 moves away from the front ends $25a_3$ and $25a_4$ of the respective impact receiving arms $25a_1$ and $25a_2$. Then, as illustrated in FIG. 2(B) and FIG. 7(A), the slider 13 is held in the non-operating state in which the front end 13a of the slider 13 is in contact with the locking pin 10 by the biasing force of the slider spring 14.

The other configurations and operations of the buckle 7 in this example are substantially the same as those of the buckle described in Japanese Unexamined Patent Application Publication No. 2012-126254 and can be readily understood from the publication, and thus the other configurations and operations are not described.

In the buckle 7 of this example having the above-described configuration, during the engagement operation of the latch 9 with the tongue 6, the damper 24 slows down the movement of the slider 13 before the slider 13 comes in contact with the stop 11f of the operation button 11. Then, the slider 13 comes in contact with the stop 11f of the operation button 11. Thus, the impact of the contact between the slider 13 and the stop 11f is reduced. This effectively reduces the noise generated when the slider 13 comes in contact with the stop 11f. Particularly, since the slider 13 is slowed down immediately before the slider 13 comes in contact with the stop 11f of the operation button 11, the slider 13 is not slowed down too much. Thus, although the buckle 7 includes the damper 24, the tongue 6 is able to promptly engage with the buckle 7, and the noise is able to be effectively reduced.

In addition, the damper 24 includes the impact receiver 25 and the damper spring 26, and the slider 13 comes in contact with the impact receiver 25 and elastically deforms the damper spring 26 before the slider 13 comes in contact with the stop 11f of the operation button 11, whereby the movement of the slider 13 is slowed down. Thus, the above-described reduction in the impact is achieved by the damper 24 having such a simple configuration.

In the seat belt apparatus 1 including the buckle 7 of this example, the noise generated during the engagement operation of the tongue 6 with the buckle 7 is reduced. Thus, comfortability of the occupant during the engagement operation of the tongue 6 with the buckle 7 is improved.

The other operational advantages of the buckle 7 and the seat belt apparatus 1 of this example are substantially the same as those of the buckle described in Japanese Unexamined Patent Application Publication No. 2012-126254 and can be readily understood from the publication, and thus the other operational advantages are not described.

Figure 8:
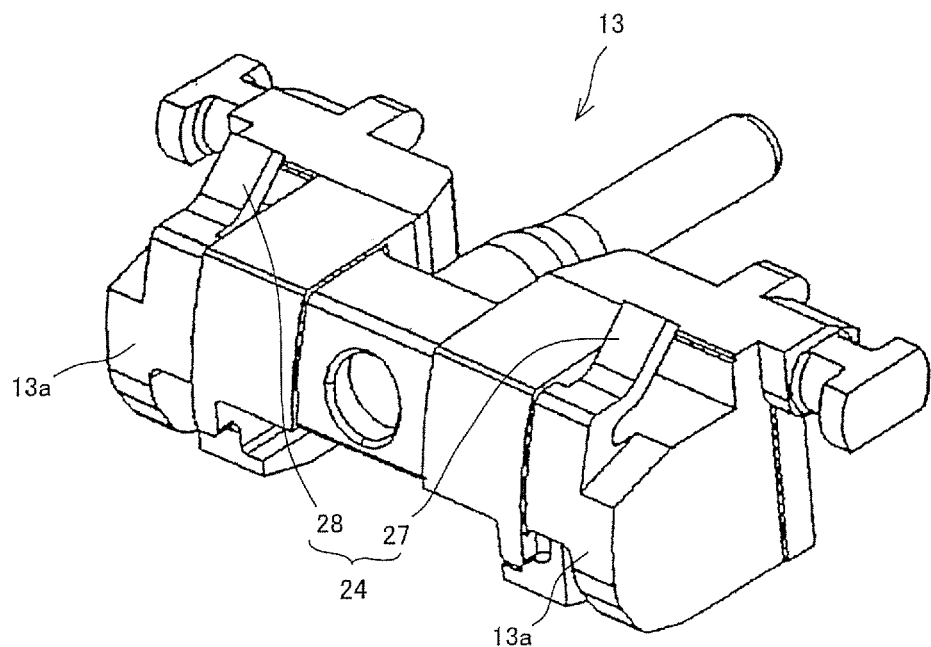
FIG. 8 is a perspective view illustrating a slider of a buckle of another example according to the embodiment of the present invention.
Figure 9:
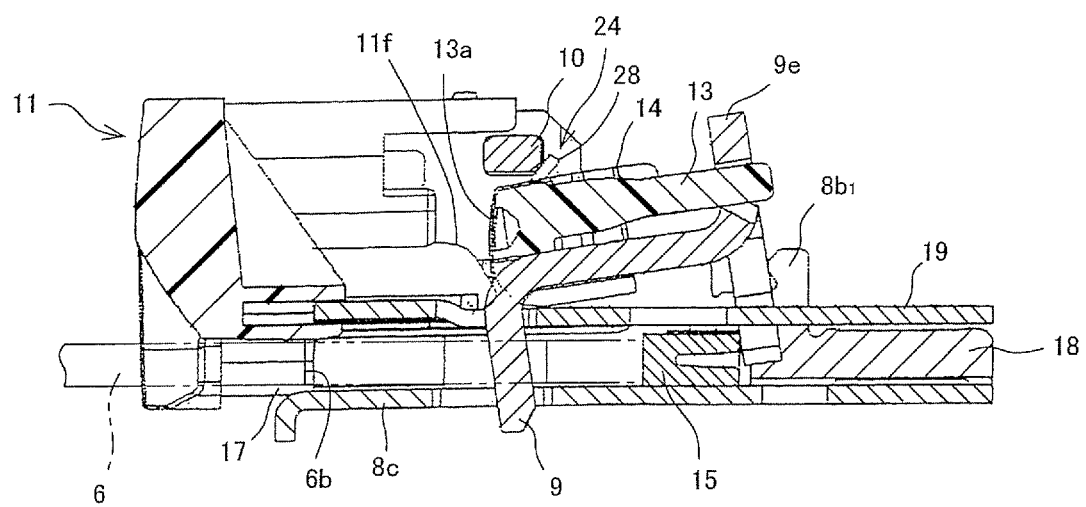
FIG. 9 is a view for explaining how the slider in the example illustrated in FIG. 8 is slowed down.

FIG. 8 is a perspective view illustrating a slider of another example of the embodiment of the buckle according to the present invention. FIG. 9 is a view for explaining how the movement of the slider in this example is slowed down. Components identical to those in the previously described example are assigned the same reference numerals as those in the previously described example and are not described in detail.

In the buckle 7 of the previously described example, the damper 24 is provided in the operation button 11, and the damper 24 includes the impact receiver 25 and the damper spring 26. However, as illustrated in FIG. 8, in the buckle 7 of this example, the damper 24 is provided on the upper surface of the slider 13.

In other words, the damper 24 of this example includes a pair of impact receivers 27 and 28 each having a fin-like shape so as to have an elastic force that can cause elastic deformation thereof. In this case, the elastic force of each impact receiver 27 and 28 is smaller than the biasing force of the slider spring 14 that biases the slider 13. The impact receivers 27 and 28 are positioned on the upper surface of the slider 13, and the impact receivers 27 and 28 and the slider 13 are formed of a single resin member. Each of the impact receivers 27 and 28 may be a separate member from the slider 13.

As illustrated in FIG. 9, the pair of impact receivers 27 and 28 is able to be in contact with the locking pin 10 during the operation of the slider 13. In such a case, the impact receivers 27 and 28 are configured to come in contact with the locking pin 10 immediately before the front end 13a of the slider 13 comes in contact with the stop 11f of the operation button 11. Then, after the impact receivers 27 and 28 come in contact with the locking pin 10 during the operation of the slider 13, further movement of the slider 13 causes the impact receivers 27 and 28 to be elastically deformed by the locking pin 10. As in the previously described example, the slider 13 is slowed down immediately before the front end 13a of the slider 13 comes in contact with the stop 11f of the operation button 11, due to the elastic force generated by the elastic deformation of the impact receives 27 and 28. Then, the front end 13a of the slider 13 comes in contact with the stop 11f. As a result, the slider 13 stops and is positioned in the locking position. As in the previously described buckle, since the slider 13 that has been slowed down comes in contact with the stop 11f, the noise generated when the slider 13 comes in contact with the stop 11f is reduced. The other configurations of the buckle 7 in this example are substantially the same as those of the buckle 7 in the previously described example and the buckle described in Japanese Unexamined Patent Application Publication No. 2012-126254, and are not described herein.

Next, operations of the buckle 7 of this example having the above-described configuration are described.

The buckle 7 of this example operates in the same way as the buckle 7 of the previously described example from the insertion of the tongue 6 into the buckle 7 in the non-operating state to the movement of the latch 9 to the latching position. However, as illustrated in FIGS. 10(A) and 10(B), the impact receivers 27 and 28 are away from the locking pin 10 when the front end 13a of the slider 13 of the buckle 7 is in contact with the locking pin 10.

Then, in the buckle 7 of this example, when the front end 13a of the slider 13 of the buckle 7 moves away from the locking pin 10 to allow the slider 13a to move relative to the latch 9, the impact receivers 27 and 28 come in contact with the locking pin 10 immediately before the front end of the slider 13a comes in contact with the stop 11f of the operation button 11 as illustrated in FIG. 10(C). Then, the further movement of the slider 13 causes the impact receivers 27 and 28 to be elastically deformed by the locking pin 10. The resistance is applied to the slider 13 due to the elastic force generated by the elastic deformation of the impact receivers 27 and 28. Thus, the movement of the slider 13 is slowed down.

As illustrated in FIG. 10 (D), when the front end 13a of the slider 13 comes in contact with the stop 11f of the operation button 11, as in the buckle 7 of the previously described example, the slider 13 stops and is positioned in the locking position. At this time, since the movement of the slider 13 is slowed down by the damper 24 before the slider 13 comes in contact with the stop 11f, the impact of the contact between the slider 13 and the stop 11f is reduced. This reduces the noise generated when the slider 13 comes in contact with the stop 11f. Then, the slider 13 positioned between the latch 9, which is positioned in the latching position, and the locking pin 10 is held down by the locking pin 10. Thus, the latch 9 is held in the latching position by the slider 13.

In such a state, if the occupant releases the tongue 6, the engaging portion 6a is pushed and moved by the ejector 15 in the removal direction in which the tongue 6 is removed from the buckle 7. As a result, as illustrated in FIG. 10(E), the edge of the engaging hole 6b of the engaging portion 6a comes in contact with the latching portion 9d of the latch 9, and thus the engaging portion 6a is prevented from moving in the removal direction in which the tongue 6 is removed from the buckle 7. The tongue 6 engages with the buckle 7 in this way. Then, an extra withdrawn portion of the seat belt 4 is retracted by the seat belt retractor 3, and thus the seat belt 4 is fastened to the occupant.

When the operation button 11 of the buckle 7 in the operating state illustrated in FIG. 10(E) is pushed and moved to the right in FIG. 10(E) to release the seat belt 4, the tongue 6 is disengaged from the latch 9, and the tongue 6 is removed from the buckle 7 as in the buckle 7 of the previously described example. Then, the seat belt 4 withdrawn so as to be worn is retracted by the seat belt retractor 3. In addition, as illustrated in FIG. 10(A), when the latch 9 comes in contact with the locking pin 10, the latch 9 stops turning, and the latch 9 is positioned in the non-operating position (non-latching position) as illustrated in FIG. 10(A). In addition, due to the movement of the slider 13, the impact receivers 27 and 28 gradually return to the non-operating state by the elasticity thereof. Then, the impact receivers 27 and 28 positioned away from the locking pin 10 return to the non-operating state.

The other operations of the buckle 7 in this example are substantially the same as those of the buckle 7 of the previously described example and the buckle described in Japanese Unexamined Patent Application Publication No. 2012-126254, and are not described herein.

In the buckle 7 of this example having the above-described configuration, the impact receivers 27 and 28 each having the fin-like shape and the slider 13 are integrally formed of a single component. Thus, the number of components is reduced, and the configuration of the damper 24 is simplified.

Other operational advantages of the buckle 7 in this example are substantially the same as those in the buckle 7 in the previously described example.

In the above-described examples, the slider 13 is held in the locking position by the stop 11f of the operation button 11, but may be held in the locking position by a stopper included in any other unmovable component of the buckle 7 such as the base 8 or the cover. In addition, the buckle according to the present invention is applicable to conventionally known buckles, such as the buckle described in Patent Literature 1, in which the ejector spring is disposed in the area α, which is the movement path of the engaging portion 6a of the tongue 6, and the imaginary extended area β, which extends from the area α in the movement direction of the engaging portion 6a. Various modifications may be applied to the present invention without departing from the scope of the claims.

INDUSTRIAL APPLICABILITY

The buckle and the seat belt apparatus of the present invention are advantageously applicable to a buckle, with which a tongue supported by a seat belt engages so as to enable the seat belt to be worn, and a seat belt apparatus including such a buckle.

REFERENCE SIGNS LIST 1 seat belt apparatus
3 seat belt retractor
4 seat belt
6 tongue
7 buckle
8 base
8a, 8b side wall
8c bottom
9 latch
11 operation button
11a, 11b guide
11c recess
11d, 11e through hole
$11d_1$ edge
11f stop
12 button spring
13 slider
13a front end
14 slider spring
15 ejector
17 tongue inlet
24 damper
25 impact receiver
25a body
$25a_1$, $25a_2$ impact receiving arm
$25a_3$, $25a_4$ front end
$25a_5$, $25a_6$ stoppers
25b spring support
26 damper spring
27, 28 impact receiver

The invention claimed is:

1. A buckle comprising:
a base;
a tongue inlet through which an engaging portion of a tongue is inserted;
a latch supported by the base so as to move between a non-engaging position at which the latch does not engage with the engaging portion of the tongue inserted through the tongue inlet and an engaging position at which the latch engages with the engaging portion of the tongue inserted through the tongue inlet;
a latch retainer configured to be held in a non-locking position at which the latch retainer does not lock the latch positioned in the non-engaging position and configured to move from the non-locking position during operation of the latch and come in contact with a stop so as to be held in a locking position at which the latch retainer locks the latch positioned in the engaging position; and
an unlocking operation member configured to move the latch positioned in the engaging position to the non-engaging position, wherein
an impact absorbing mechanism configured to, during the operation of the latch, slow down the movement of the latch retainer before the latch retainer in motion comes in contact with the stop, such that the latch retainer that is slowed down comes in contact with the stop.

2. The buckle according to claim 1, wherein the impact absorbing mechanism includes: an impact receiver with which the latch retainer comes in contact before coming into contact with the stop; and a damper spring configured to bias the impact receiver, and
the latch retainer comes in contact with the impact receiver so as to elastically deform the damper spring, such that the movement of the latch retainer is slowed down.

3. The buckle according to claim 2, wherein the impact receiver and the damper spring are integrally provided in the unlocking operation member.

4. The buckle according to claim 1, wherein the impact absorbing mechanism includes an impact receiver that is elastically deformable, and
the impact receiver is elastically deformed before the latch retainer in motion comes in contact with the stop, such that the movement of the latch retainer is slowed down.

5. The buckle according to claim 4, wherein the impact receiver has a fin-like shape and is integrally formed with the latch retainer.

6. A seat belt apparatus comprising:
a seat belt configured to hold an occupant;
a seat belt retractor disposed on a chassis and configured to retract the seat belt; and
a buckle disposed on the chassis and configured to engage with a tongue in a removable manner, wherein
the buckle is the buckle according to claim 1.

* * * * *